United States Patent [19]
Jones

[11] 3,829,010
[45] Aug. 13, 1974

[54] THERMOSTAT FOR POWER VENTILATORS AND THE LIKE

[75] Inventor: James D. Jones, Houston, Tex.

[73] Assignee: Wind Wonder, Inc., Houston, Tex.

[22] Filed: Dec. 14, 1972

[21] Appl. No.: 315,230

[52] U.S. Cl............... 236/49, 98/43, 236/78, 318/471
[51] Int. Cl............................................ A62c 3/14
[58] Field of Search............... 98/43; 236/49, 78 B; 318/334, 471 X; 417/14

[56] References Cited
UNITED STATES PATENTS

| | | | |
|---|---|---|---|
| 3,367,408 | 2/1968 | Moreland | 318/334 X |
| 3,454,078 | 7/1969 | Elwart | 165/27 |
| 3,739,980 | 6/1973 | Andersen | 236/49 |

Primary Examiner—William E. Wayner
Attorney, Agent, or Firm—Donald Gunn

[57] ABSTRACT

A thermostat for use with a power ventilator which responds to attic or inside temperatures to actuate a motor turning a power ventilator, said thermostat incorporating a first means which is responsive to ambient temperature of the air causing the apparatus to turn on and a second means responsive to temperature of the ambient air in case of fire or overheating which turns the apparatus off. The circuitry connects directly with conventional AC power lines and includes a pair of separate isolated circuit legs, one of which is temperature responsive in the manner described above so that signals are formed therein and the other leg of the circuit including switching means, switching the current off and on for a motor for such a power ventilator.

13 Claims, 2 Drawing Figures

THERMOSTAT FOR POWER VENTILATORS AND THE LIKE

BACKGROUND OF THE INVENTION

In the cooling of attics, warehouses and other areas, power ventilators are often used. Power ventilators normally include a motor which drives a fan. The motor is switched on by means of a thermostat which is located at an appropriate point. Thermostats currently found in use include bimetals which have contacts which are moved to appropriate open and closed positions. The bimetal must be exposed to the ambient air to cause the contacts to be moved. This exposes the contacts to dirt, dust and other airborne materials which eventually cause the contacts to pit, arc or possibly fail. Because the bimetal consists of two dissimilar metals in contact with each other, humidity in the air causes electrolysis or corrosion to occur. Thus, a physical change in the bimetal takes place as a result of this electrolysis which in turn changes the set point or calibration of the bimetal device. These conditions often necessitate replacement of the bimetal thermostat.

Heretofore, other types of electronic speed controls have been furnished but they do not provide the facility or control as that provided in the present invention. The prior art references which are believed of interest, include the following references:

| | |
|---|---|
| 3,454,078 | 3,543,119 |
| 3,475,677 | 3,590,365 |

SUMMARY OF THE PRESENT INVENTION

The present invention comprises two embodiments which are adapted for use in ambient air thermostats, and more particularly thermostats for power ventilators. A power ventilator is a device which is normally installed to cool a closed building, attic or other space. When the air temperature rises to a certain level, the thermostat of the present invention senses this temperature level and switches on the power ventilator. The power ventilator preferably comprises a fan driven by an electric motor which is positioned in an opening in the wall or roof for blowing air from the closed space to the exterior. When the closed space air temperature decreases to a certain level, the thermostat of the present invention senses this temperature level and switches the power ventilator off. The present invention further incorporates circuit means responsive to increase of temperature to even higher levels as will typically only occur in the event of fire. This switches the power ventilator off which prevents the power ventilator from fanning the fire, thereby increasing damage in the event of fire. The apparatus in a first form preferably includes a motor which is any suitable AC single phase motor, typically a shaded pole motor for rotation of a fan within a power ventilator. The motor is connected in series with a triac. In addition, a pair of temperature responsive circuit means is arranged in a circuit leg connected across the AC source which forms a signal indicative of ambient air temperature. The ambient air is sensed by a positive temperature coefficient thermistor and a negative temperature coefficient thermistor. The points at which the two thermistors change resistance are adjusted to define an operating range. At temperatures above and below the operating range, the motor is not operated. A coupling circuit transfers a signal from the thermistor circuitry to a light dependent resistor which is connected with the control gate of the triac. In a second embodiment, a positive temperature coefficient thermistor is connected with a triac where the triac serves as the temperature sensitive device. It is in series with a neon coupled light source which manipulates a light dependent resistor connected to the gate of a second triac which again is in series with a motor, switching the motor off and on.

DESCRIPTION OF THE PREFERRED EMBODIMENT

Figure 1:
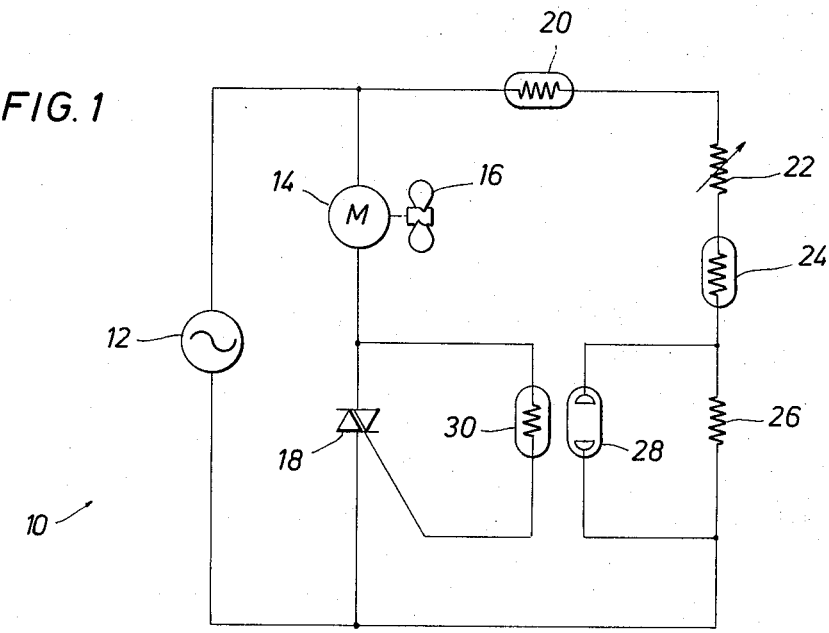
Figure 2:
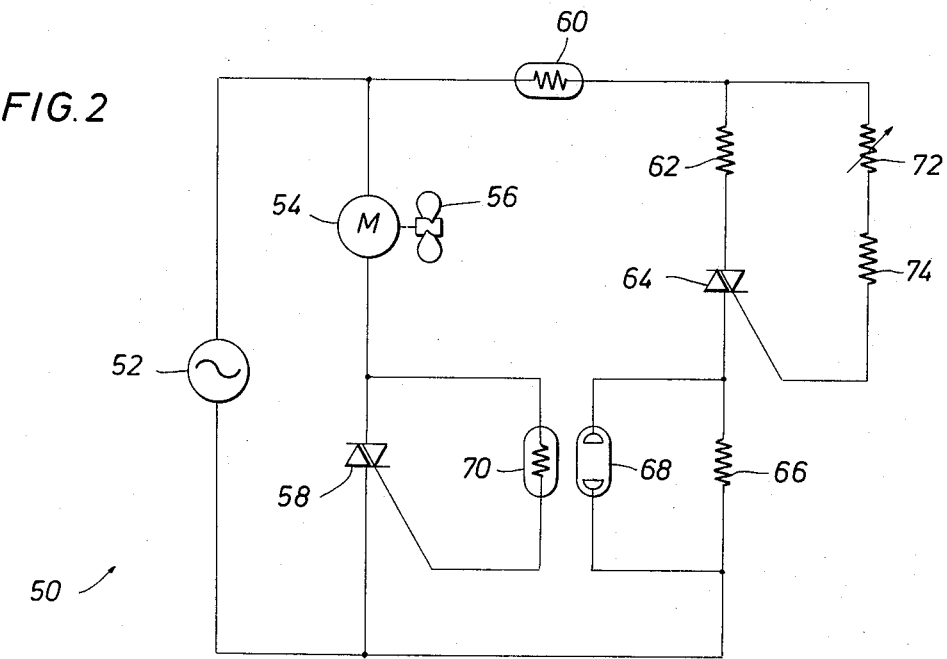

FIG. 1 is a schematic wiring diagram of a first version of an electronic thermostat for power ventilators; and FIG. 2 is a schematic wiring diagram of an alternative form of ambient air thermostat for use with a power ventilator.

DESCRIPTION OF THE PREFERRED EMBODIMENT

Attention is directed to FIG. 1 where 10 identifies a thermostat responsive to ambient air temperatures for us in control of a power ventilator. The numeral 12 identifies a typical AC power source which can be the commercial line voltage furnished to the facility. The numeral 14 identifies a motor which is connected with a fan 16. The motor and fan comprise a portion of the power ventilator and are adapted to be positioned in a roof or high wall opening for exhausting warm air from an attic, building or other crawl space. Typically, a pipe or metal flashing will be constructed and arranged around the fan. Moreover, louvers which are air operated are often incorporated to prevent the entry of rain. In any event, the motor 16 is preferably any single phase shaded pole motor. It is typically a fractional horsepower motor. It is connected to the voltage source 12 and one side communicates through a triac 18. The triac 18 switches current off and on to control operation of the motor 14.

The numeral 20 identifies a first thermistor which has a positive temperature coefficient as a function of temperature. That is to say, its resistance remains essentially unaltered for temperatures up to a certain level. A typical level will be about 160°) F. Thereabove, the increase in ambient temperature increases the resistance of the thermistor. The increase in resistance is such as to cause the apparatus to turn off the motor 14 at elevated temperatures such as 175° F. Of course, different temperatures can be selected. More will be noted concerning this hereafter.

The thermistor 20 is connected in series with an adjustable resistor 22 which permits adjustment of the sensitivity of the circuitry to be described. A second thermistor 24 is in series arrangement with the components named above. The thermistor 24 has a negative temperature coefficient. Preferably, it maintains a normal terminal resistance up to a specified temperature such as about 85° or 90° F. Increases above this temperature level cause the terminal resistance of the thermistor 24 to drop. For instance, at 120°, the resistance should drop measurably. It will be observed that the thermistors 20 and 24 change resistance on increased temperature in opposite manner.

The numeral 26 identifies an additional resistor in series with the three components named above. A neon bulb 28 is connected across the resistor 26. The voltage drop across the resistor 26 and hence, the voltage applied to the bulb is dependent on the resistance of the thermistors 20 and 24. The neon bulb is preferably illuminated by the circuitry on achieveing ambient temperatures within the desired range. For instance, if the equipment to be operated with ambient air temperatures between 90° and 160° F., the bulb is preferably illuminated when this temperature is achieved. The bulb is preferably extinguished at temperatures below this level or above this level. To this end, the two thermistors described above and the adjustable resistor 22 cause the bulb to be illuminated in this range. Of course, different ranges can be selected and to this end, different thermistors can be used. The threshold at which thermistor resistance varies can be selected by the user.

The four resistive components and the neon bulb described heretofore are all located in a single leg of the circuitry which forms an output signal, in the form of light emitted from the bulb which is used to turn the motor 14 off and on. The circuitry described to this juncture is also isolated in a single leg. The leg is isolated from the motor circuitry. This prevents spikes from causing false triggering of the motor.

The bulb 28 is communicated with a light dependent resistor 30. Of course, mechanically, these two components are sealed together and spaced apart so that light cannot intrude from other sources. The light dependent resistor 30 is connected to the gate of the triac 18. When light impinges on the resistor 30, its terminal resistance drops and a signal is coupled to the gate of the triac, causing the triac to conduct. When the triac conducts, the motor 14 is operated in the conventional manner.

From the foregoing description, it will be observed that the embodiment 10 is switched on when the temperature comes up to a level causing the thermistor 24 to drop in resistance. A further increase in temperature does not produce additional change until the thermistor 20 begins to increase in resistance.

Attention is next directed to FIG. 2 of the drawings where the numeral 50 identifies an alternative embodiment of the present invention. The numeral 52 identifies a similar power source which supplies power to a motor 54 which rotates the fan 56 in like manner. The numeral 58 identifies a triac connected in series with the motor.

The numeral 60 identifies a positive temperature coefficient thermistor. It is connected in a leg of circuitry which forms a signal for control of the motor 54. The numeral 62 identifies a series dropping resistor connected with a triac 64. The triac 64 is connected to a series resistor 66 which is connected in parallel with a neon bulb 68. The bulb 68 forms signals of the same sort as the bulb 28 mentioned with reference to FIG. 1 of the drawings. The bulb 68 forms signals which illuminate a resistor 70 which varies in resistance dependent on the light falling thereon. The resistor 70 is connected to the gate of the triac 58.

The numeral 72 identifies an adjustable resistor in series with a fixed resistor 74. The resistor 74 provides gate voltage control for the triac 64.

The thermistor 60 and the triac 64 are preferably exposed to ambient air temperatures. As the ambient air alters the temperature of these two devices, their operating characteristics vary. The thermistor 60 functions in the same manner as the thermistor 20 with the embodiment 10. The triac 64 however responds to ambient air to adjust its triggering level. Thus, a voltage is furnished to the gate of the triac 64 depending on the setting of the variable resistor 72. As the triac 64 is heated to the triggering level, it causes conduction through the triac. When the triac drops below the threshold temperature at which triggering occurs, nonconduction occurs. Thus, the triac operates as an electronic switch controlling current through the neon bulb 68. When the bulb has current, it forms light which impinges the light dependent resistor 70. The light impinging on the resistor 70 drops its resistance, thereby providing a suitable triggering voltage to the gate of the triac 58 and causing it to conduct. When it conducts, the motor 54 is turned on.

The resistor 72 can be used to adjust the lower or threshold temperature for the circuitry shown at 50. In this manner it is similar to the resistor 22 in the embodiment 10.

In both embodiments, they are preferably placed in sealed enclosures with the elements, 20, 24, 60 and 64 exposed to ambient air temperatures, either directly or through the use of a heat sink. This is to be contrasted with construction of bimetal thermostats known in the art which are likely to pit or corrode at the contacts when dust or other particles in the air collect on the contacts as well as variations in calibration due to the electrolytic effects of joining two dissimilar metals.

The foregoing is directed to two alternative embodiments of the present invention but the scope thereof is determined by the claims which are appended hereto.

I claim:

1. A thermostat for use in a power ventilator which responds to ambient air temperature wherein the ventilator includes a fan which is rotated by an electric motor, said thermostat comprising:
   a power connection across such a motor to provide electrical power thereto;
   switch means having a control terminal and in series with said motor and operable to control current flow through such a motor;
   temperature sensitive means exposed to the temperature of the ambient air in the near vicinity, said means responding to temperature increase above a predetermined level to attain an altered condition such that an output signal is formed by a signal forming means and applied to the terminal of said switch means to turn said motor on; and,
   said means further being responsive to increase of ambient air temperature above a second predetermined level which causes the formation of a signal turning said switch means off.

2. The circuit of claim 1 wherein said temperature responsive means includes a circuit component having a positive temperature coefficient which alters operation thereof above the second predetermined temperature.

3. The circuit of claim 1 wherein said temperature responsive means includes a circuit component having a negative temperature coefficient which alters operation of said circuit at temperatures above said first predetermined level.

4. The circuit of claim 1 including a pair of series thermistors, one having a positive temperature coefficient and the other having a negative temperature coefficient, said two thermistors determining said first and second predetermined temperature levels.

5. The circuit of claim 1 wherein said temperature responsive means includes a triac which is exposed to ambient air temperatures which alters the triggering level thereof.

6. The circuit of claim 5 wherein said triac has a gate connected to an adjustable voltage source.

7. The circuit of claim 5 including a circuit component having a positive temperature coefficient serially arranged to cause increased voltage drop thereacross on increased temperature.

8. The circuit of claim 1 including a separate circuit incorporating said temperature sensitive means, and said signal forming means forming a signal applied to said switch means through an isolated connection.

9. The circuit of claim 1 wherein said switch means is a triac.

10. The circuit of claim 9 including a light dependent resistive circuit component which is light coupled to said signal forming means, and said circuit component is connected to the gate of said triac.

11. The thermostat of claim 1 wherein said temperature sensitive means includes a solid state semiconductor having a gate terminal thereon.

12. The circuit of claim 11 wherein the semiconductor is a triac.

13. The circuit of claim 12 wherein the triac has a gate connected to an adjustable bias level.

* * * * *